UNITED STATES PATENT OFFICE.

FRANZ VON KÜGELGEN AND GEORGE O. SEWARD, OF HOLCOMBS ROCK, VIRGINIA, ASSIGNORS, BY MESNE ASSIGNMENTS, TO ELECTRO METALLURGICAL COMPANY, A CORPORATION OF WEST VIRGINIA.

METALLURGICAL PROCESS.

No. 878,966.  Specification of Letters Patent.  Patented Feb. 11, 1908.

Application filed January 30, 1905. Serial No. 243,413.

*To all whom it may concern:*

Be it known that we, FRANZ VON KÜGELGEN, a subject of the German Emperor, and GEORGE O. SEWARD, a citizen of the United States, both residing at Holcombs Rock, in the county of Bedford and State of Virginia, have jointly invented certain new and useful Improvements in Metallurgical Processes, of which the following is a specification.

The object of our invention is to provide a simple commercial method of producing metals or alloys from metalliferous ores, mixtures of oxids, haloid salts, and mixtures of haloid salts and oxids, all of which we include herein under the generic term "metallic compounds". These compounds we reduce by means of phosphids or a mixture of phosphids. These phosphids contain phosphorus combined with metals, as, for instance, calcium-phosphid; aluminium-phosphid; iron phosphid; chromium-phosphid, etc. These phosphids may act in different ways on the mixture to be reduced. If the phosphorus and the metal with which it is combined as a phosphid each form compounds corresponding to the compound of the metal to be reduced having a higher heat of formation than the compound to be reduced, both elements of the phosphid will act as reducing agents. If, for example, we reduce chromium-oxid by calcium-phosphid, we have the following reaction:

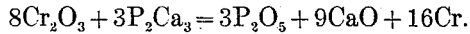

In this case both Ca and P take part in the reduction, or the chromium is reduced by the chemical energy of both elements.

Another reaction will occur when the phosphid used is of a metal which in its phosphid is chemically inert—*e. g.*

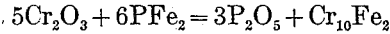

where the iron does not act as a reducing agent and merely combines with the reduced metal.

With haloid salts or metals the reactions are similar according to the nature of the phosphid and haloid to be reduced, either both elements of the phosphid or only the phosphorus acting as reducing agents.

The heat of reaction is very different in different cases and in many cases the heat of reaction will have to be supplemented to a greater or less degree by other heating. In some cases the reaction will continue by the heat of the reaction after being started by the supplementary heating.

We claim as our invention:

1. The herein described process of reduction of an ore or metallic compound reducible by phosphorus, which consists in effecting substantially the sole reduction of such ore or compound by causing a metallic phosphid to react therewith.

2. The described process of reducing metallic compounds reducible by phosphorus, which consists in bringing into contact therewith a phosphid in such proportion as to effect the entire reduction, and raising the temperature sufficiently to institute a reaction whereby the metal of said compound is separated.

3. The described process of reducing metallic compounds reducible by phosphorus, which consists in subdividing the same and commingling therewith at normal temperature a metallic phosphid in such proportion as to effect the entire reduction, and raising the temperature of the mixture to ignition.

4. The described process of reducing metallic compounds, which consists in heating together the compound to be reduced and a phosphid of a metal which in its phosphid is chemically inert, whereby the phosphorus of the phosphid acts as a reducing agent and the inert metal combines with the reduced metal.

5. The described process of reducing chromium oxid which consists in causing a metallic phosphid to react therewith.

6. The described process of reduction of an ore or unreduced metallic compound reducible by phosphorus, which consists in heating a mixture thereof with a phosphid.

7. The described process of reduction of an ore or unreduced metallic compound reducible by phosphorus, which consists in heating a mixture thereof with a metallic phosphid.

8. The described process which consists in reacting on an unreduced mass of a metallic compound with a metallic phosphid.

In witness whereof, we have hereunto signed our names in the presence of two subscribing witnesses.

FRANZ VON KÜGELGEN.
GEORGE O. SEWARD.

Witnesses:
JNO. B. HUFFARD,
C. OFFERHAUS.